US008908796B1

(12) United States Patent
Guvenkaya et al.

(10) Patent No.: US 8,908,796 B1
(45) Date of Patent: Dec. 9, 2014

(54) ORTHOGONAL FREQUENCY DIVISION MULTIPLEXING (OFDM) TRANSMITTER AND RECEIVER WINDOWING FOR ADJACENT CHANNEL INTERFERENCE (ACI) SUPPRESSION AND REJECTION

(71) Applicants: Ertugrul Guvenkaya, Tampa, FL (US); Huseyin Arslan, Tampa, FL (US)

(72) Inventors: Ertugrul Guvenkaya, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 14/276,629

(22) Filed: May 13, 2014

Related U.S. Application Data

(60) Provisional application No. 61/823,654, filed on May 15, 2013.

(51) Int. Cl.
| | |
|---|---|
| *H04K 1/02* | (2006.01) |
| *H04L 25/03* | (2006.01) |
| *H04L 25/49* | (2006.01) |
| *H04J 11/00* | (2006.01) |
| *H04L 27/26* | (2006.01) |
| *H04L 25/08* | (2006.01) |

(52) U.S. Cl.
CPC ......... *H04J 11/0023* (2013.01); *H04L 27/2671* (2013.01); *H04L 25/08* (2013.01); *H04L 27/2688* (2013.01)
USPC ............ 375/296; 375/340; 375/342; 375/346

(58) Field of Classification Search
CPC ............ H04L 27/2602; H04L 27/2601; H04L 27/2647; H04L 25/03834; H04L 5/0007; H04L 27/2614; H04L 25/0204; H04J 14/0298

USPC .................................. 375/296, 340, 342, 346
See application file for complete search history.

(56) References Cited

U.S. PATENT DOCUMENTS

| | | | | |
|---|---|---|---|---|
| 6,088,398 | A * | 7/2000 | Wahlqvist et al. | 375/260 |
| 7,023,938 | B1 * | 4/2006 | Kapoor et al. | 375/350 |
| 7,072,411 | B1 * | 7/2006 | Dollard | 375/260 |
| 7,751,509 | B1 * | 7/2010 | Lehnert | 375/346 |
| 8,009,750 | B2 | 8/2011 | Chrabieh et al. | |

(Continued)

FOREIGN PATENT DOCUMENTS

WO 2007048278 A1 5/2007

OTHER PUBLICATIONS

Varshney and Thomas. Sidelobe Reduction for Matched Filter Range Processing. IEEE Radar Conference. 2003: 1-7.

(Continued)

*Primary Examiner* — Shuwang Liu
*Assistant Examiner* — Sung Ahn
(74) *Attorney, Agent, or Firm* — Molly Sauter; Smith & Hopen, P.A.

(57) ABSTRACT

An optimum time domain windowing scheme for orthogonal frequency-division multiplexing (OFDM)-based waveforms in the sense of spectral concentration is proposed. Instead of evenly suppressing the sidelobes along the frequency, the sidelobe power is concentrated within a guard band while maximally suppressing the power for a desired frequency range. This is achieved by employing optimum finite duration pulses, prolate spheroidal wave functions (PSWF), to shape the OFDM transmit pulse. Also with per-subcarrier windowing scheme, the effect of inner subcarriers on sidelobes is diminished by utilizing the concentration bandwidth versus out-of-band power trade-off in PSWF and the multicarrier nature of the OFDM.

4 Claims, 7 Drawing Sheets

(56) References Cited

U.S. PATENT DOCUMENTS

| | | | |
|---|---|---|---|
| 2004/0022175 A1* | 2/2004 | Bolinth et al. | 370/203 |
| 2005/0036563 A1* | 2/2005 | Suzuki et al. | 375/260 |
| 2006/0072486 A1* | 4/2006 | Park | 370/310 |
| 2006/0239367 A1* | 10/2006 | Wilhelmsson et al. | 375/260 |
| 2007/0263738 A1* | 11/2007 | Jitsukawa et al. | 375/260 |
| 2009/0207888 A1* | 8/2009 | Yamasuge et al. | 375/141 |
| 2009/0296784 A1* | 12/2009 | Kirsch et al. | 375/130 |
| 2012/0321016 A1 | 12/2012 | Andrews et al. | |
| 2013/0129017 A1* | 5/2013 | Sahin et al. | 375/296 |
| 2013/0246495 A1* | 9/2013 | Svore et al. | 708/491 |

OTHER PUBLICATIONS

Anderson and Rusek. Optimal Side Lobes under Linear and Faster-than-Nyquist Modulation. IEEE International Symposium on Information Theory. ISIT. 2007: 2301-2304.

Redfern. Receiver Window Design for Multicarrier Communication Systems. IEEE Journal on Selected Areas in Communications. 2002. vol. 20 (No. 5): 1029-1036.

Bala et al., Shaping Spectral Leakage: A Novel Low-Complexity Transceiver Architecture for Cognitive Radio. IEEE Vehicular Technology Magazine. 2013. vol. 8 (Issue 3): 38-46.

* cited by examiner

SPECTRAL EFFICIENCY INCREASE RELATIVE TO RC WINDOWING FOR
FIXED CHANNEL BANDWIDTH

| ACLR (dB) | SC index | Increase relative to RC windowing (%) | |
|---|---|---|---|
| | | Even prolate | Per-subcarrier prolate |
| 60 | 256 | 0.42 | 0.91 |
| 65 | 256 | 0.66 | 1.25 |
| 70 | 256 | 2.28 | 2.95 |
| 75 | 256 | 3.43 | 4.01 |

Fig. 5

ORTHOGONAL FREQUENCY DIVISION MULTIPLEXING (OFDM) TRANSMITTER AND RECEIVER WINDOWING FOR ADJACENT CHANNEL INTERFERENCE (ACI) SUPPRESSION AND REJECTION

BACKGROUND OF THE INVENTION

Orthogonal frequency-division multiplexing (OFDM) signaling schemes dominate the existing and future wireless communication systems due to the robustness of OFDM against multipath delay spread and the flexibility of OFDM in spectrum usage, making OFDM a strong candidate for dynamic spectrum access (DSA)-based networks.

Despite the advantages of OFDM, an OFDM signal exhibits high spectral sidelobes as a result of the rectangular transmit pulse. An Orthogonal Frequency Division Multiplexing (OFDM) signal consists of sinusoidal signals that are shaped with the rectangular function to generate the rectangular transmit pulse. As a result of the shaping of the sinusoidal signals utilizing a rectangular function, the OFDM signal suffers from high out-of-band radiation due to high spectral sidelobes of sine shaped subcarriers, resulting in adjacent channel interference (ACI). Additionally, the rectangular windowing used at the receiver results in a frequency response of the receiver filter (i.e. sine) having weak ACI rejection capability.

Two common countermeasures are known to reduce the out-of-band (OOB) radiation, the first is known as time domain windowing and the second is known as frequency domain guard insertion. In time domain windowing, the rectangular pulse is filtered by a windowing function that smooths the symbol transitions. In frequency domain guard insertion, edge-band subcarriers are nulled to reduce spectral leakage to the out-of-band.

Additionally, there exist active techniques to suppress the spectral sidelobes. While these techniques give good suppression results, they are primarily computationally complex due to the data-dependent optimization problem and symbol-by-symbol processing. In addition, some of the techniques known in the art increase the peak-to-average power ratio (PAPR), degrade the bit error rate performance and require data dependent information for symbol recovery.

Alternatively, time domain windowing techniques with guard subcarrier insertion are a much simpler and computationally efficient alternative to reduce out-of-band radiation for OFDM based systems. In addition, the guarding effect of time domain windowing against multipath delay spread is an inherent advantage of the windowing technique over the aforementioned scheme.

In accordance with the Uncertainty Principle, a signal cannot be simultaneously limited in time and frequency. As such, a rectangular transmit pulse trades the spectral confinement in OFDM. With windowing techniques, containment in the time domain is relaxed to achieve a better spectrally-localized signal. However, conventional windowing schemes, e.g. commonly used raised cosine (RC) windowing, do not provide the optimum solution for time-frequency localization. In other words, the available frequency band near the main band of the signal, which can be the guard band between the adjacent channels or the band between the edge subcarrier and the spectral mask to be complied, is not maximally utilized with the conventional windowing techniques.

While other windowing functions may be utilized to reduce the out-of-band (OOB) power, these windowing functions do not optimally address the need for the reduction and rejection of ACI.

Accordingly, what is needed in the art is an OFDM windowing technique that provides ACI suppression and rejection.

SUMMARY OF INVENTION

The present invention addresses the need for maximum ACI suppression at the transmitter side through the implementation of a per-subcarrier transmit windowing technique which utilizes a unique windowing function for each individual subcarrier, or alternatively, a common windowing function applied to each individual subcarrier. At the receiver side, the present invention provides maximum ACI rejection through the implementation of a per-subcarrier receiver windowing technique which utilizes a unique windowing function for each individual subcarrier, or alternatively, a common windowing function applied to each individual subcarrier In accordance with the present invention, a method for time domain windowing of a received Orthogonal Frequency Division Multiplexing (OFDM)-based signal is provided. The method includes, receiving an OFDM-based signal comprising a plurality of subcarriers and performing discrete prolate spheroidal windowing of each of the plurality of subcarriers of the received OFDM-based signal. The discrete prolate spheroidal windowing may be performed using a common windowing function having a confinement band that is determined by the spectral location of the edge subcarrier to shape each of the plurality of subcarriers, as is the case in even prolate windowing. Alternatively, the discrete prolate spheroidal windowing may be performed using a unique windowing function for each of the plurality of subcarriers, as is the case in per-subcarrier prolate windowing. The unique windowing function used to shape each of the plurality of subcarriers has a confinement band that is determined by the summation of a guard band of the OFDM-based signal and the spectral distance between the subcarrier and the edge subcarrier.

In accordance with the present invention, a method for time domain windowing of an Orthogonal Frequency Division Multiplexing (OFDM)-based signal to be transmitted is provided. The method includes, performing discrete prolate spheroidal windowing of each of the plurality of subcarriers of the received OFDM-based signal and transmitting the signal. The discrete prolate spheroidal windowing may be performed using a common windowing function having a confinement band that is determined by the spectral location of the edge subcarrier to shape each of the plurality of subcarriers, as is the case in even prolate windowing. Alternatively, the discrete prolate spheroidal windowing may be performed using a unique windowing function for each of the plurality of subcarriers, as is the case in per-subcarrier prolate windowing. The unique windowing function used to shape each of the plurality of subcarriers has a confinement band that is determined by the summation of a guard band of the OFDM-based signal and the spectral distance between the subcarrier and the edge subcarrier.

A system for performing the time domain windowing in accordance with the present invention may include a transceiver, or alternatively a transmitter and a receiver.

In accordance with the present invention, a time domain windowing scheme that provides the optimum confinement of the OFDM-based waveforms in time and a given frequency band is introduced. Optimum time-limited functions in the sense of spectral containment, known as prolate spheroidal wave functions (PSWF), are adopted for maximum time-frequency localization that can be achieved with the transmitter waveform design in OFDM systems. By taking the mainlobe width vs. sidelobe suppression trade-off of PSWFs into account along with the multicarrier nature of the OFDM signals, the effect of inner subcarriers on sidelobes is nearly canceled using a per-subcarrier windowing scheme. The proposed scheme also allows different suppression in lower and upper bands which can be utilized in cognitive radio (CR) applications.

Utilizing the filter-bank waveform design approach of the present invention, the significant advantages of OFDM, such as rectangular receiver filtering with discrete Fourier transform (DFT) and one tap frequency domain equalization with cyclic prefix (CP) usage are maintained.

With the present invention, at the transmitter side, the available guard band near the transmission band is maximally utilized and hence optimum suppression beyond the guard band is achieved. In other words, adjacent channel interference (ACI) in the OFDM system is maximally suppressed by utilizing unique per-subcarrier transmit-windowing in accordance with the present invention.

Additionally, at the receiver side, receiver windowing is also used for ACI rejection. By utilizing a unique, optimum windowing function for each received subcarrier, contribution from the transmission band of the adjacent channel is maximally reduced. In other words, in accordance with the present invention, the guard band between the adjacent channels is exploited while rejecting the ACI.

In an alternative embodiment, a common windowing function can be utilized for all subcarriers, instead of a unique windowing function for each individual subcarrier. The common windowing function has a localization range that is determined by only the guard band between the adjacent channels. Although this embodiment may result in a suboptimal solution, it might have slightly simpler implementation since only one common windowing function is utilized for each of the subcarriers.

In contrast with the conventional techniques, such as raised cosine (RC) windowing, the proposed time domain windowing scheme provides more flexibility, including asymmetric spectral shaping for lower and upper frequencies and arbitrary guard band utilization without changing timing parameters of the transmitted signal, as well as superior spectral suppression in the desired range.

BRIEF DESCRIPTION OF THE DRAWINGS

For a fuller understanding of the invention, reference should be made to the following detailed description, taken in connection with the accompanying drawings, in which:

FIG. 5 is a table illustrating the spectral efficiency increase relative to RC windowing for fixed channel bandwidth.

DETAILED DESCRIPTION OF THE PREFERRED EMBODIMENT

Figure 1A:
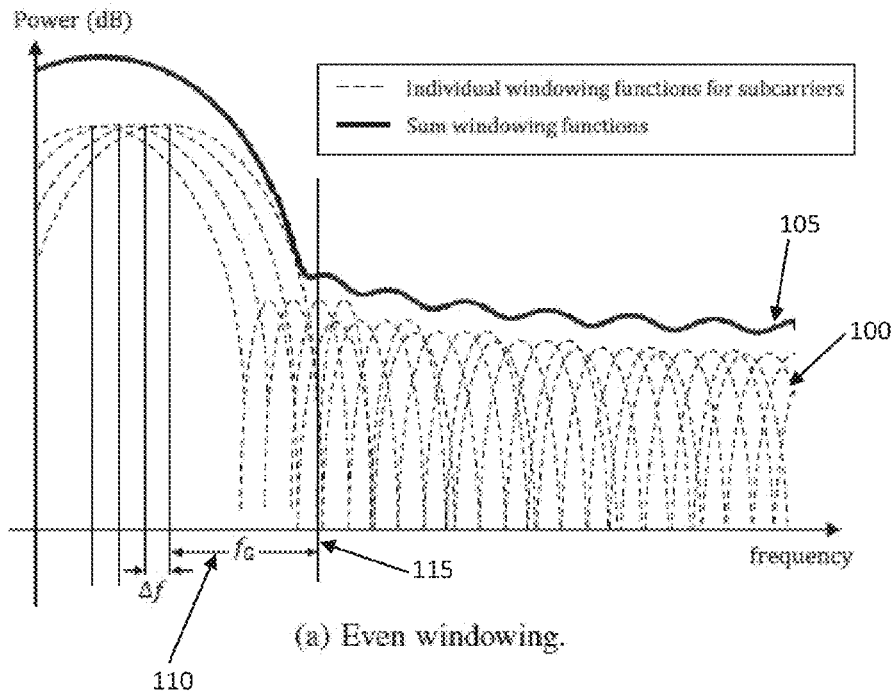
FIG. 1(a) is a graph illustrating even windowing of an OFDM signal utilizing a common windowing function for each subcarrier, accordance with the present invention.

A discrete time domain OFDM symbol with N subcarriers is generated by performing inverse discrete Fourier transform (IDFT) to the complex baseband data vector $$[X_0^{(m)}, X_1^{(m)}, \ldots, X_{N-1}^{(m)}]^T,$$

where m is the symbol index. Before defining the time domain symbol, DFT matrix is denoted by $F_{N,N}$ with entries $$(F_{N,N})_{n,K} = e^{-j\frac{2\pi}{N}n(k-N/2)}, \quad (1)$$
$$n, k = 0, \ldots, N-1.$$

The vector that represents mth time domain OFDM symbol is written as $$x^{(m)} = 1/N F_{N,N}^* X^{(m)}, \quad (2)$$

Where $F_{N,N}^*$ is complex conjugate of $F_{N,N}$, i.e. IDFT matrix. For the time domain windowing implementation, a window matrix $D_{N+G+2M,N}$ is defined whose column is the window function for corresponding subcarrier including time extension of G-sample CP (cyclic prefix), M-samples pre-windowing, and M-samples post-windowing durations. Thus, elements of the window matrix can be written as $$(D_{N+G+2M,N})_{n,k} = w_k(n) \quad (3)$$

where $w_k(n)$ is the window function, i.e. transmit pulse, for kth subcarrier. Considering the overlapping of the consecutive symbols in the windowing interval, windowed OFDM symbol to be transmitted, $y^{(m)}$, is written as $$y^{(m)} = \frac{1}{N}\begin{bmatrix}(D_B \circ F_B^*)X^{(m)} + (D_A \circ F_A^*)X^{(m-1)} \\ F_G^* X^{(m)} \\ F_{N,N}^* X^{(m)}\end{bmatrix}, \quad (4)$$

where ∘ is Hadamard product operation, $\mathcal{D}_B$ and $\mathcal{D}_A$ are the subsets of $D_{N+G+2M,N}$ containing only the rows that correspond to pre-window (rows 0 to M−1) and post-window (rows N+G+2M−1), respectively. Similarly, $\mathcal{F}_B^*$, $\mathcal{F}_A^*$ and $\mathcal{F}_G^*$ are the subsets of the $F_{N,N}^*$ with the rows regarding to the pre-window (rows N−G−M to N−G−1), the post window (rows 0 to M−1), and the CP (rows N−G to N−1), respectively. Note that the entrywise product of the window matrix corresponding to the CP and useful symbol durations are omitted in (4) since corresponding elements of the window matrix consist of ones.

In the present invention, the window function, w(n), is obtained by filtering the rectangular pulse with the windowing function, v(n), which corresponds to multiplying the sinc-shaped subcarrier spectrum by the Fourier transform (FT) of v(n). Since the envelope of the subcarrier spectrum, before filtering, is monotonically decreasing along the frequency, designing the v(n) for optimal spectral concentration satisfies the same objective for w(n).

The spectral concentration problem for finite duration pulses falls under the PSWF family, which relates to maximum concentration in time for a band-limited signal, or maximum spectral concentration for a time-limited signal. When considering a digital baseband implementation, the discrete case of the windowing design is adopted. For the sequence v(n) that is index-limited from 0 to M−1, the ratio of the signal energy in the frequency range|f|≤W<½ to the total energy can be expressed as $$\lambda(M, W) = \frac{\int_{-W}^{W} |V(f)|^2 df}{\int_{-1/2}^{1/2} |V(f)|^2 df} \quad (5)$$

where V(f) is the FT of v(n). By using Parseval's theorem, (5) can be rewritten in terms of v(n) as $$\lambda(M, W) = \frac{\sum_{l=0}^{M-1} \sum_{n=0}^{M-1} \frac{v^*(n)(\sin(2\pi W(l-n)))}{\pi(l-n)} v(l)}{\sum_{n=0}^{M-1} |v(n)|^2} \quad (6)$$

It can be shown that the vector v(M,W)=[v(0), v(1), . . . , v(M−1)]$^T$ that maximizes λ(M, W) must satisfy $$A(M,W)v(M,W) = \lambda(M,W)v(M,W) \quad (7)$$

where A(M, W) is an M×M matrix with entries $$(A(M, W))_{n,l} = \frac{\sin(2\pi W(l-n))}{\pi(l-n)},$$

$$n, l = 0, \ldots, M-1.$$

Since the matrix is self-adjoint, the system in (7) has M distinct, real eigenvalues (concentration ratios) and corresponding real eigenvectors (windowing sequences), which are also known as discrete prolate spheroidal sequences (DPSS). Therefore, the spectral concentration problem for windowing functions reduces to finding the eigenvector of A(M, W) that corresponds to the largest eigenvalue λ(M,W). Resulting in M-sample sequences that maximizes the signal energy on the frequency interval [−W, W] is denoted as $v_{PS}$(M, W; n).

Guard bands are used to enable the signal spectrum to fall below a desired power level at adjacent channel frequencies. With prolate windowing, this available buffer spectral zone is utilized to achieve maximum suppression beyond this guard band. In prevalent OFDM systems, the windowing operation is performed after obtaining the time domain OFDM symbol, i.e. one window function is used for every subcarrier. When the same procedure is followed, the method of even prolate-windowing using a common windowing function for each of the subcarriers, as taught by the present invention, can be represented by defining the window function as $$w_k(n) = v_{ps}(M+1, \Gamma/N; n) * rect(n/(N+G+M)) \quad (8)$$

where Γ is the guard band that is normalized to subcarrier spacing while N corresponds the normalized sampling frequency, so that the ratio of the Γ/N denotes the fractional bandwidth for optimum localization of the discrete time OFDM signal. Note that the window sequence in (8) is not a function of the subcarrier index, thus, the even prolate-windowing method inherits the conventional windowing implementation.

With reference to FIG. 1(a), the power spectra of the windowing functions for each subcarrier 100 and the combination of the windowing functions for the upper edge of the frequency band 105 are illustrated using a common windowing function for each of the subcarriers, resulting in even prolate-windowing. As shown in FIG. 1(a) each subcarrier is shaped with a common windowing function whose confinement band is determined by the spectral location 110 of the edge subcarrier 115.

As the spectral concentration constraint of the prolate windowing functions is relaxed, superior suppression beyond the localization band is achieved. By considering this trade-off, along with the multicarrier structure of the OFDM waveform, the available guard band of individual subcarriers, which have different distances to a fixed out of band location, can be maximally exploited. Therefore, the windowing function is designed per subcarrier such that the concentration ratio, W, for each subcarrier is the summation of the guard band and the spectral distance of the corresponding subcarrier to the edge subcarrier. The window functions that constitutes $D_{N+C+ZM,N}$ in the per-subcarrier case can be written as $$w_k(n) = v_{ps}(M+1, W(k); n) * rect(n/(N+G+M)) \quad (9)$$

where W(k) is the subcarrier-dependent optimization range. In order to maximize utilization of the available band for each subcarrier, localization bandwidth is limited to lower guard-band, $\Gamma_U$, that can be represented as $$W(k) = \min\left(\frac{k+\Gamma_L}{N}, \frac{N-1-k+\Gamma_U}{N}\right) \quad (10)$$

Figure 1B:
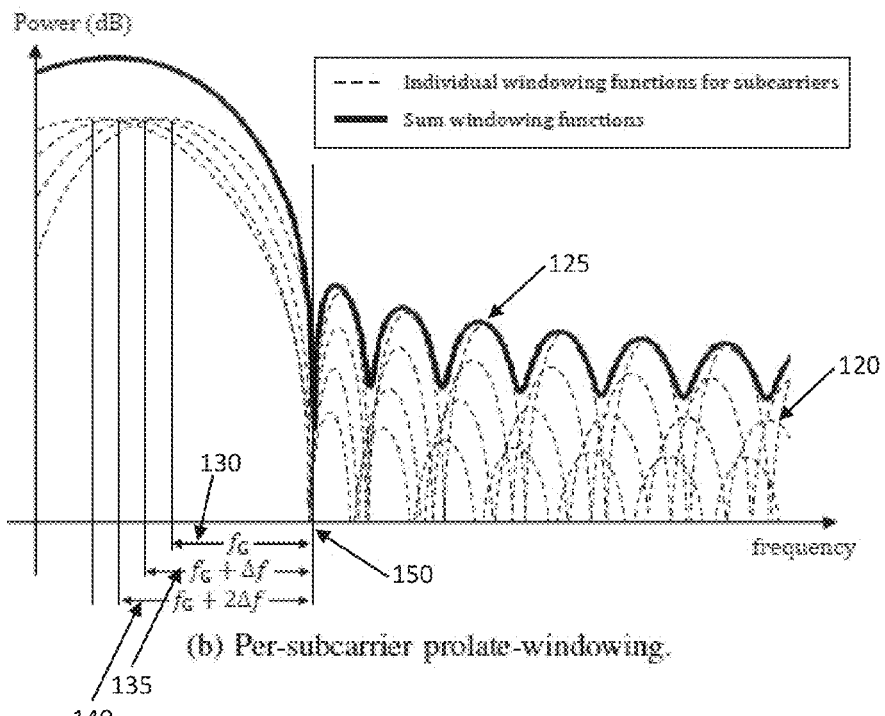
FIG. 1(b) is a graph illustrating per-subcarrier prolate-windowing of an OFDM signal utilizing a unique windowing function for each subcarrier, in accordance with an embodiment of the present invention.

The per-subcarrier prolate windowing scheme, in accordance with the present invention, is depicted in FIG. 1(b). As shown in FIG. 1(b), the power spectra of the windowing functions for each subcarrier 120 and the combination of the windowing functions for the upper edge of the frequency band 120 are illustrated using a unique windowing function for each of the subcarriers, resulting in per-subcarrier prolate-windowing. FIG. 1(b) illustrates per-subcarrier prolate windowing employing a unique windowing function for each subcarrier wherein the optimization range of each subcarrier's windowing function is based on the subcarrier index. By assigning relaxing concentration to their bands, the effect of inner subcarriers is dramatically reduced. Confinement bandwidths 130, 135, 140 are increased with the subcarrier spacing steps by keeping the optimization range the same for whole signal spectrum. Reduced sidelobes of the windowing function of the inner subcarriers becomes negligible compared to the effect of the edge subcarrier 150, thus it can be concluded that the spectral out-of-band emission is determined by only the edge subcarrier with per-subcarrier prolate windowing.

Also, in such scenarios that require different spectral suppression in lower and upper adjacent channels, as in emerging spectrum pooling and CR applications, asymmetric spectral suppression is possible by choosing the lower guard band $\Gamma_L$ and the upper guard band $\Gamma_U$ independently.

Spectral suppression performance of any windowing type is a function of the amount of relaxation in the time domain, that is, longer windowing durations provides better out-ofband suppression with the penalty of reduced spectral efficiency. So far, the design of the OFDM waveform that gives the optimum spectral localization for a given windowing duration M has been presented. However, to achieve the joint packing of the signal in time and frequency domains, different roll-off factors need to be investigated. Therefore, the problem becomes selecting the windowing duration and the number of guard subcarriers to the given spectral mask to be compiled. Therefore, the objective is to minimize the total redundancy in the system, namely windowing duration, while maximizing the number of used subcarriers that maximizes the spectral efficiency by maximizing the information that is packed into the given frequency resource limited by the spectral mask.

Figure 2:
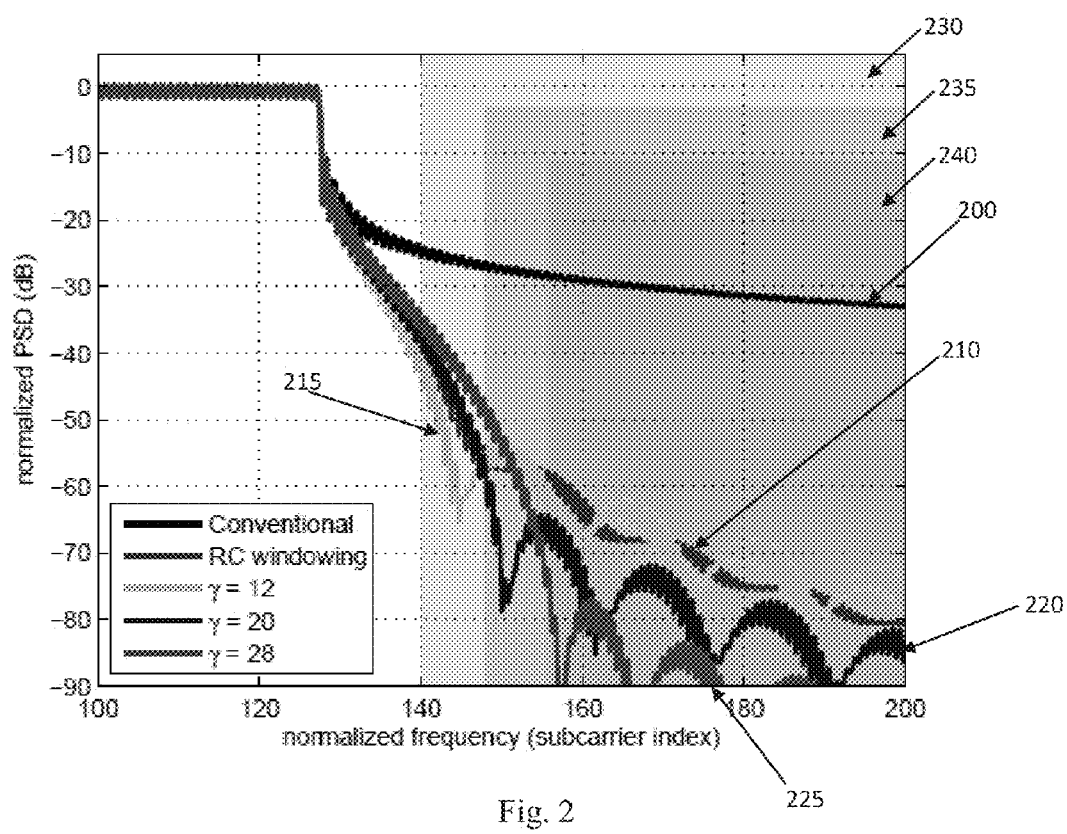
FIG. 2 is a graph illustrating the normalized power spectra comparisons of other windowing solutions and the windowing solution in accordance with an embodiment of the present invention.

In an exemplary embodiment, the performance of the windowing technique is presented having an OFDM system with N=256, G=16 and M=16. In this exemplary embodiment, DC subcarrier is disabled. First, the out-of band emissions are investigated for the optimization guard band ranges Γ=12, 20 and 28 for unique per-subcarrier prolate windowing scheme. The normalized power spectra are shown in FIG. 2, including the conventional OFDM system without symbol extension 200 and RC-windowed OFDM system 210 for comparison. For each optimization range configuration. 215 (Γ=12), 220 (Γ=20) and 225 (Γ=28), the per-subcarrier windowing scheme provides better suppression performance in the corresponding desired frequency ranges that are indicated by shaded areas, 230 (Γ=12), 235 (Γ=20) and 240 (Γ=28). Additionally, even prolate-windowing using a common windowing function is considered a sub-optimal solution.

Figure 3:
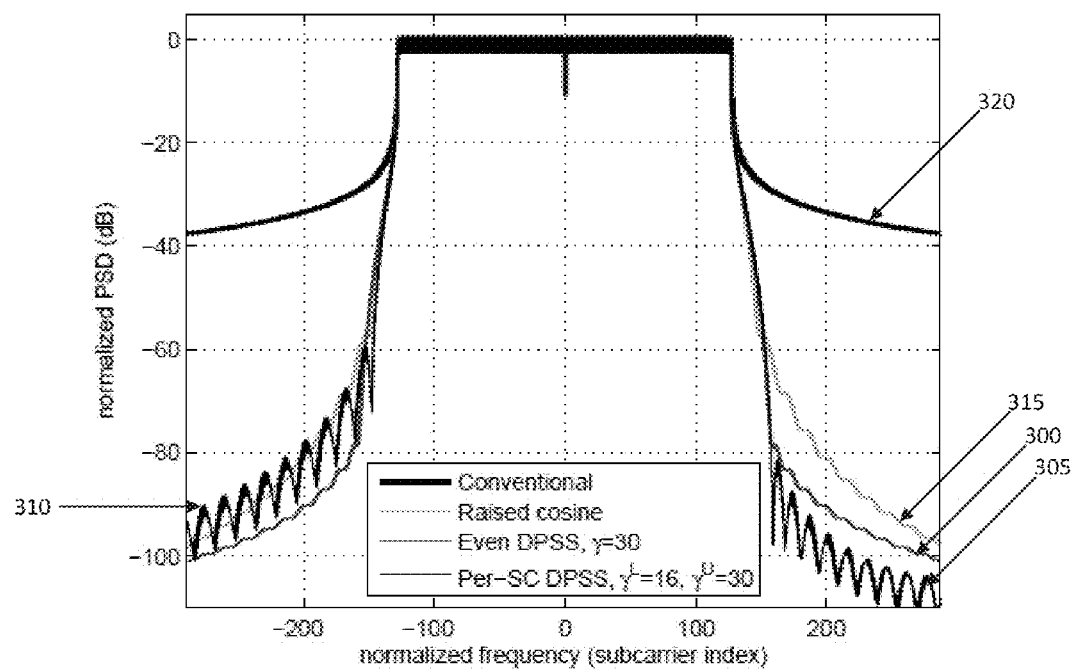
FIG. 3 is a graph illustrating the normalized power spectra for even prolate-windowing in accordance with an embodiment of the present invention.

FIG. 3 illustrates the normalized power spectra for even prolate-windowing 300 with Γ=30 together and with asymmetrical implementation of the per-subcarrier case 305, 310 to point to the enhanced flexibility in spectral shaping. In the asymmetrical per-subcarrier implementation, optimization ranges are set as $Γ_L$=16 305 and $Γ_U$=30 310, resulting in 20 dB additional suppression in the upper adjacent band 310 in comparison to the lower adjacent band 305. The power spectra for conventional OFDM windowing 320 and for RC windowing 315 are also illustrated for comparison.

Figure 4:
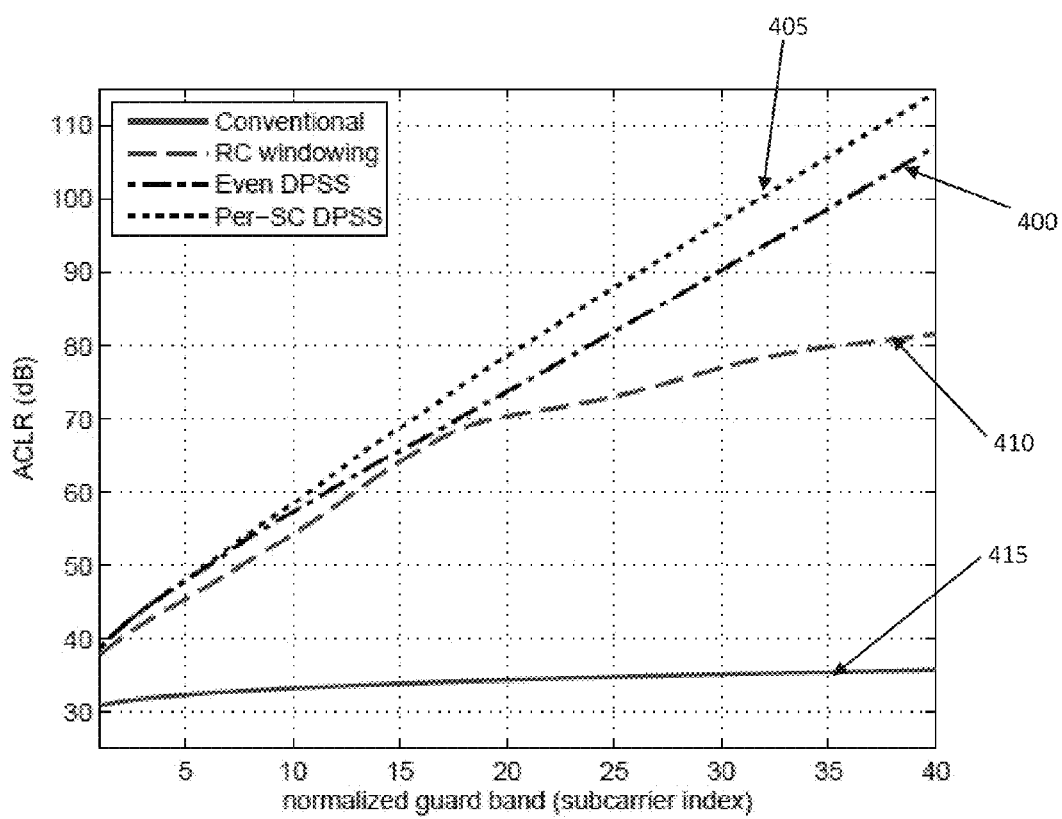
FIG. 4 is a graph illustrating the ACLR performance of each windowing type as a function of guard band size.

The effect of the present technique is further investigated on adjacent channel leakage ratio (ACLR) as a function of guard band between the channels. In FIG. 4, ACLR performances of each windowing type are given as a function of guard band size. It is shown that the ACLR in even prolate windowing 400 and per-subcarrier prolate windowing 405 in accordance with the present invention, outperform the RC (raised-cosine) windowing 410 by around 5 dB up to the normalized guard band of 16 which is also the windowing roll off factor, N/M. Beyond this range, suppression performance increases dramatically as the guard size increases. Additionally, it is shown that the even prolate windowing 400 and per-subcarrier prolate windowing 405 in accordance with the present invention, outperform the conventional windowing technique 415.

For a given spectral mask, i.e. frequency index, and the ACLR limit out of the index, even-prolate and per-subcarrier prolate windowing usage provides better spectral efficiency by allowing more subcarrier population and/or less windowing size utilization. The table shown in FIG. 5 includes the achieved spectral efficiency increase attained using even prolate windowing and per-subcarrier prolate windowing, in accordance with the present invention, compared to widely used RC windowing for different ACLR limits with fixed total channel bandwidth. The increment in spectral efficiency increases as the sidelobe suppression requirement is forced further, which is the critical challenge in CR scenarios. The technique of the present invention can be utilized for enhancing sidelobe suppression with fixed N and M or for improving the spectral efficiency by populating more subcarriers for a given spectral mask of ACLR limit.

Frequency resource that is employed for signals that fall below the desired power level, is maximally utilized with prolate windowing for OFDM-based signals. The per-subcarrier windowing scheme of the present invention achieves optimum spectral containment, hence minimum out-of-band radiation in OFDM systems with time domain windowing.

In accordance with the present invention, a transmit windowing scheme for OFDM that maximally suppresses the ACI by utilizing the available guard band between the adjacent channels as well as the band between each subcarrier and the edge subcarrier is proposed. Similarly, the maximum localized windowing functions are used for the receiver windowing so that the ACI rejection capability of the receiver filter is enhanced at the spectral range that the adjacent channel signal exists by optimally utilizing the guard band between the adjacent channel bands.

Figure 6:
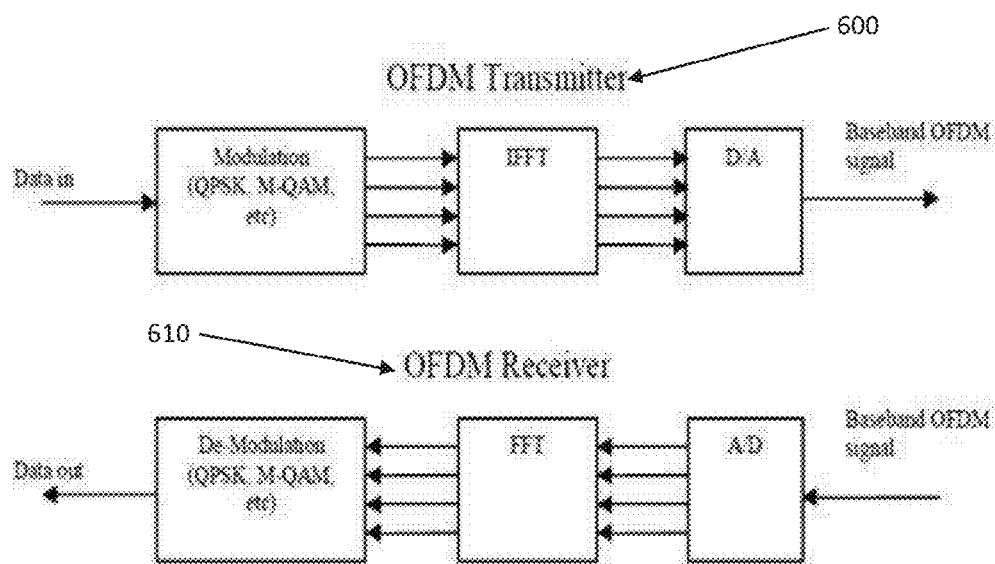
FIG. 6 is a block diagram illustrating an OFDM transmitter and an OFDM receiver in accordance with an embodiment of the present invention.

As shown with reference to FIG. 6, the method of the present invention may be employed in an OFDM transmitter 600 and/or an OFDM receiver 610. The proposed windowing scheme utilizes the available spectral room while shaping the transmitted signal and receiver windowing. Thus, maximum ACI suppression at the transmitter 600 and maximum ACI rejection at the receiver is achieved. Since transmit and receive windowing works independently, they can be used together or either one can be implemented in transmitter 600 or receiver 610.

Figure 7:
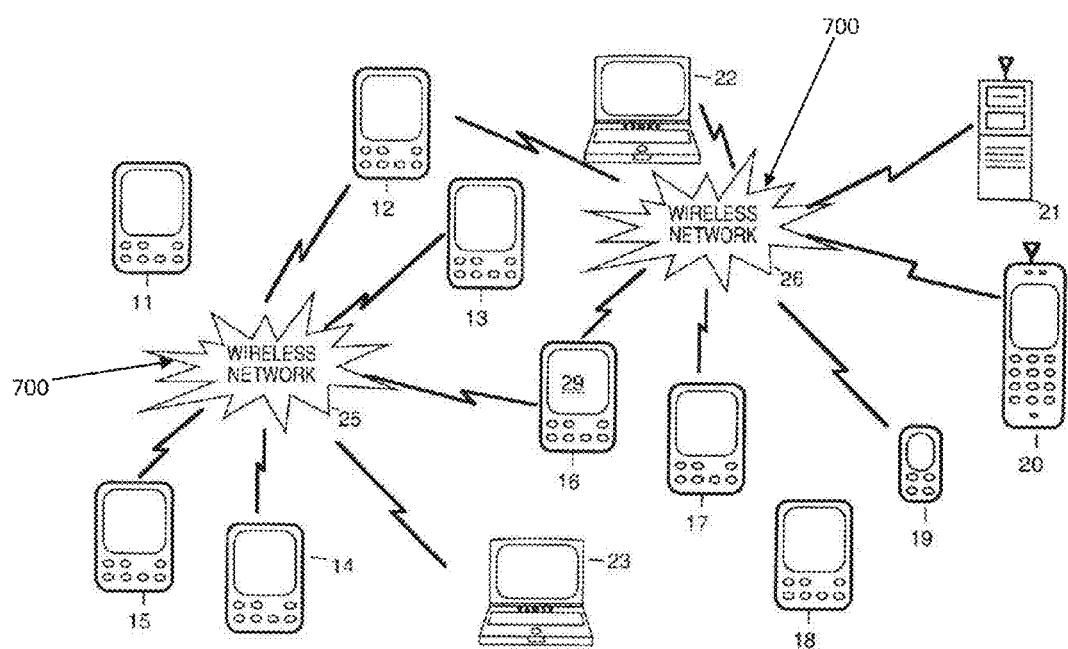
FIG. 7 is a diagram illustrating a wireless network in accordance with an embodiment of the present invention.

In a particular embodiment, the system and method of the present invention may be utilized in a wireless network system 700 employing mobile devices 11, 12, 13, 14, 15, 16, 17, 18, 19, 20, 21, 22 as illustrated with reference to FIG. 7.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A method for time domain windowing of an Orthogonal Frequency Division Multiplexing (OFDM)-based signal, the method comprising: receiving, at a receiver, an OFDM-based signal comprising a plurality of subcarriers; and performing, at the receiver, discrete prolate spheroidal windowing of each of the plurality of subcarriers of the received OFDM-based signal, wherein performing discrete prolate spheroidal windowing of each of the plurality of subcarriers of the received OFDM-based signal further comprises:

identifying a spectral location of an edge subcarrier of the plurality of subcarriers;

identifying a spectral distance between each of the plurality of subcarriers and the edge subcarrier;

identifying a unique windowing function for each of the plurality of subcarriers, the unique windowing function for each of the plurality of subcarriers having a confinement band that is determined by the summation of a guard band of the OFDM-based signal and the spectral distance between the subcarrier and the edge subcarrier; and performing, at the receiver, discrete prolate spheroidal windowing of each of the plurality of subcarriers of the received OFDM-based signal by shaping each of the plurality of subcarriers using the unique windowing function identified for each of the plurality of subcarriers.

2. The method of claim 1, wherein the unique windowing function for each of the plurality of subcarriers further comprises a confinement band that is determined by the summation of a guard band of the OFDM-based signal and the spectral distance between the subcarrier and the edge subcarrier, and wherein identifying a unique windowing function for each of the plurality of subcarriers further comprises:

identifying a unique windowing function for an upper adjacent band of the ODFM-based signal based upon an upper guard band; and identifying a unique windowing function for a lower adjacent band of the OFDM-based signal based upon a lower guard band.

3. A method for time domain windowing of an Orthogonal Frequency Division Multiplexing (OFDM)-based signal, the method comprising:

performing, at a transmitter, discrete prolate spheroidal windowing of each of a plurality of subcarriers of an OFDM-based signal, wherein performing discrete prolate spheroidal windowing of each of the plurality of subcarriers of the OFDM-based signal further comprises;

identifying a spectral location of an edge subcarrier of the plurality of subcarriers;

identifying a spectral distance between each of the plurality of subcarriers and the edge subcarrier;

identifying a unique windowing function for each of the plurality of subcarriers, the unique windowing function for each of the plurality of subcarriers having a confinement band that is determined by the summation of the guard band of the OFDM-based signal and the spectral distance between the subcarrier and the edge subcarrier;

shaping each of the plurality of subcarriers using the unique windowing function identified for each of the plurality of subcarriers; and transmitting, from the transmitter, the OFDM-based signal.

4. The method of claim 3, wherein the unique windowing function for each of the plurality of subcarriers further comprises a confinement band that is determined by the summation of a guard band of the OFDM-based signal and the spectral distance between the subcarrier and the edge subcarrier, and wherein identifying a unique windowing function for each of the plurality of subcarriers further comprises:

identifying a unique windowing function for an upper adjacent band of the ODFM-based signal based upon an upper guard band; and identifying a unique windowing function for a lower adjacent band of the OFDM-based signal based upon a lower guard band.

\* \* \* \* \*